United States Patent [19]

Degen et al.

[11] Patent Number: 5,492,781
[45] Date of Patent: Feb. 20, 1996

US005492781A

[54] BATTERY SEPARATORS

[75] Inventors: Peter J. Degen, Huntington; Joseph Lee, South Setauket, both of N.Y.

[73] Assignee: Pall Corporation, East Hills, N.Y.

[21] Appl. No.: 182,718

[22] Filed: Jan. 18, 1994

[51] Int. Cl.$^6$ ............................................... H01M 2/16
[52] U.S. Cl. ................................. 429/144; 429/250
[58] Field of Search .............................. 427/180, 316; 429/144, 145, 250; 204/296

[56] References Cited

U.S. PATENT DOCUMENTS

| | | | |
|---|---|---|---|
| 3,978,185 | 8/1976 | Buntin et al. | 264/93 |
| 4,078,124 | 3/1978 | Prentice | 429/144 |
| 4,165,352 | 8/1979 | Volkman | 264/113 |
| 4,220,693 | 9/1980 | Di Palma et al. | 429/145 X |
| 4,230,549 | 10/1980 | D'Agostino et al. | 429/250 X |
| 4,288,503 | 9/1981 | Goldberg | 429/145 |
| 4,594,202 | 6/1986 | Pall et al. | 264/8 |
| 4,657,807 | 4/1987 | Fuerstman | 427/316 |
| 4,880,548 | 11/1989 | Pall et al. | 210/767 |
| 5,180,647 | 1/1993 | Rowland et al. | 429/145 X |

FOREIGN PATENT DOCUMENTS

| | | | |
|---|---|---|---|
| 0547237 | 6/1993 | European Pat. Off. | |
| 54-116645 | 9/1979 | Japan | 429/145 |
| 5-234578 | 9/1993 | Japan. | |
| 5-258741 | 10/1993 | Japan. | |
| 5-290822 | 11/1993 | Japan. | |
| 1505877 | 3/1978 | United Kingdom. | |

OTHER PUBLICATIONS

*Kirk–Othmer Encyclopedia of Chemical Technology*, 3, 545–568 (1978) (Month N/A).
*Encyclopedia of Polymer Science & Engineering*, 10, 219–223 (1985) (Month N/A).

Primary Examiner—Stephen Kalafut
Attorney, Agent, or Firm—Leydig, Voit & Mayer, Ltd.

[57] ABSTRACT

The present invention provides a battery separator comprising a nonwoven electrolyte reservoir layer bonded to a nonwoven support layer. The support layer comprises fibers having a mean diameter greater than about 15 microns, and preferably has been calendared to a thickness of less than about 10 mils, with a thickness variability of no more than about 10%. The electrolyte reservoir layer comprises fibers having a mean diameter of about 10 microns or less, and a thickness of less than about 15 mils, and preferably is melt-blown directly onto the support layer. The nonwoven fibers that comprise the electrolyte reservoir layer and the support layer are selected from the group consisting of polyethylene, polypropylene, polymethylpentene, and combinations thereof. The present invention also provides a battery containing such a battery separator, as well as a method of preparing such a battery separator.

22 Claims, No Drawings

BATTERY SEPARATORS

TECHNICAL FIELD OF THE INVENTION

The present invention pertains to a battery separator and associated method of production, as well as to a starved-electrolyte battery containing the battery separator. In particular, the present invention is directed towards a battery separator having low electrolytic resistance and high uniformity.

BACKGROUND OF THE INVENTION

A wide variety of products, from consumer electronics to battery-powered electric vehicles, utilize electrochemical energy sources. Similarly, there are a great number of primary and secondary batteries that have been devised or proposed for these varying applications. For example, the following electrochemical systems are known: AgO/Zn, $Ag_2O/Zn$, HgO/Zn, HgO/Cd, Ni/Zn, Ni/Cd, Ni/MH, and Zn/air.

A battery is a device that is capable of converting electrochemical energy into direct current and may be designated as either a primary or a secondary battery. The difference between primary batteries and secondary batteries is in the type of electrochemically active material that is employed. Primary batteries, or fuel cells, are defined as those battery systems that create electric current through the oxidation of fossil fuels and their derivatives. *Kirk-Othmer Encyclopedia of Chemical Technology*, 3, 545 et seq. (1978). As such, when the fuel is completely consumed, the life of the battery is completely exhausted. Secondary cells, on the other hand, generate electrical current through reversible chemical reactions, and thus may be recharged by applying an external current through the battery in a direction opposite to normal current flow. Id. at 569.

Batteries are made up of one or more battery cells. In its most elementary form, a battery cell comprises a pair of plates, namely, an anode and a cathode, a battery separator, and an electrolyte. When a load is applied to the battery, electrons are generated through oxidation at the anode. The electrons thus generated pass through the load, then return to the battery cell at the cathode, where the cathode is reduced.

In such battery cells, the electrolytic solution, i.e., the solution containing the electrolyte, is the medium for mass transport between the plates. The primary functions of the battery separator are to prevent physical contact between the plates and to retain the electrolytic solution. In a starved-electrolyte battery cell, the separator completely occupies the space between the plates, and the electrolytic solution is completely contained within the battery separator. The battery separator thus functions as the reservoir for the electrolytic solution in such cells.

Battery separators for such electrochemical systems desirably possess a variety of characteristics. For example, the battery separator should be spontaneously, uniformly, and permanently wettable in order to accommodate the electrolytic solution, which is typically aqueous. The spontaneous wettability of the battery separator ensures that the absorption of the electrolytic solution by the battery separator during battery manufacture will not result in the existence of spots which are devoid of electrolyte, e.g., gas bubbles, within the battery separator, which would adversely affect performance. The uniform wettability of the battery separator ensures that the battery separators will have consistent properties and that, therefore, batteries manufactured using such separators will perform consistently and predictably. The permanent wettability of the battery separator ensures that, over the service life of a battery, the battery separator will not develop spots which are devoid of electrolyte, e.g., gas bubbles, within the battery separator, which would alter and adversely affect performance.

The separator further should be dimensionally stable, and preferably does not swell significantly upon introduction of the electrolytic solution. Of course, the battery separator also should be chemically inert to the harsh acidic or alkaline conditions commonly found within battery cells. In addition, the battery separator should have a high mechanical strength. Preferably, the mechanical strength of the battery separator in the machine direction is at least 5 lb/linear in. width. More preferably, the tensile strength of the battery separator in the machine direction is at least 10 lb/linear in. width. This will allow the battery separator to be incorporated into a battery using conventional manufacturing processes.

Another desired feature of such a battery separator is that it present a minimal electrolytic resistance, preferably a resistance less than about 50 $m\Omega\text{-in}^2$, e.g., about 15–50 $m\Omega\text{-in}^2$, or even as low as 10 $m\Omega\text{-in}^2$ or less, measured in 40% KOH at 1000 Hz at 23° C., or as determined by the requirements of a given battery cell. Minimal electrolytic resistance is important for a number of reasons. For example, if the electrolytic resistance is too great, the rates of oxidation and reduction of the electrode plates will be retarded, and the power output of the battery lessened correspondingly.

The electrolytic resistance of a battery separator is a direct function of the ability of the electrolyte to pass through the separator. In addition, this resistance depends on the amount of electrolyte contained within the separator. For this reason, the battery separator preferably is designed such that the electrolytic solution is quickly and completely imbibed by the battery separator. In other words, the battery separator should have a high capillarity and be completely wetted. Moreover, for ease of battery manufacture, the battery separator should be able to rapidly wick the electrolytic solution when the solution is introduced to the separator. In addition, it is highly desirable that the battery separator have a high and consistent absorption capacity, i.e., that it is able to absorb a large quantity of electrolytic solution. Preferably, a battery separator should be able to absorb 100–300% of its weight of an electrolytic solution.

A battery separator also preferably has a uniform structure. This entails that both the absolute thickness of the separator and the density of the separator be uniform. If the structure within the battery separator is not uniform, the electrolytic resistance of the battery can become nonuniform, for example, through the formation of spots devoid of electrolytic solution, e.g., gas bubbles, within the separator. This may lead to a nonuniform current distribution within the battery separator. Moreover, if the electrolyte concentration within the battery separator should grow less uniform over time, the electrolytic resistance may rise to such a level as to render the battery inoperative.

A further benefit of a uniform separator is that the properties of each separator produced by a given manufacturing process will be consistent and predictable. During the manufacturing process, dozens of battery separators may be cut from a single roll of material. If the physical properties of the lot of material vary, the separators produced from the material may have unpredictable characteristics. For example, the amount of electrolyte imbibed by each separator may vary, causing difficulty with the final battery manufacturing process. Moreover, should a given lot of battery separators have diverse electrolytic resistances, wide fluctuations in the voltages and power outputs of the batteries produced with these separators can result.

Various battery separators have seen designed throughout the years in an attempt to achieve one or more of these desirable advantages. Yet, in many cases the design of the battery separators has compromised a number of desirable features. For example, as a result of efforts to render the surface of the battery separators spontaneously wettable, many battery separators are formed with materials that are capable of being leached by the electrolytic solution. These materials may include surface-active compounds or other wetting agents. When these compounds are leached from the battery separator, the structure and spontaneous wettability with electrolyte of the separator is degraded. Moreover, the leached materials contaminate the electrolytic solution and may react with and degrade the electrolytic solution. Each of these effects reduces the useful life of the battery. Similarly, many battery separators contain metallic contaminants, which also may be leached into the electrolytic solution with similar adverse effects.

A particular problem that the prior art has failed to address in a satisfactory manner is the problem of dry spots within the separator. Nonuniformity can cause the electrolytic solution to channel through segments of the battery separator, thereby resulting in the formation of dry spots. These dry spots reduce the effective area through which the electrolytic solution may travel, thereby increasing the electrolytic resistance of the battery separator. Nonuniformity may, in addition, cause innumerable manufacturing problems when attempting to produce batteries having consistent properties.

Accordingly, the present invention seeks to attain the features desired of a battery separator with minimal compromise. Thus, the present invention is directed toward producing a battery separator that possesses a low resistance to the passage of electrolyte. Moreover, the present invention is concerned with providing a battery separator that is readily compatible with an electrolytic solution, and that has, for example, high capillarity, dimensional stability upon wetting, high absorption capacity, and good resistance to leaching and other chemical attack. In addition, the present invention seeks to improve upon the uniformity of the battery separators known in the art, thereby addressing the problems of dry spot formation and manufacturing quality control. Complete batteries and methods of manufacturing battery separators also fall within the purview of the present invention. These and other advantages and benefits of the present invention will be apparent from the description of the present invention set forth herein.

BRIEF SUMMARY OF THE INVENTION

The present invention provides a battery separator that comprises a nonwoven electrolyte reservoir layer bonded to a nonwoven support layer. The support layer comprises fibers having a mean diameter greater than about 15 microns. Preferably, the support layer has been calendared to a thickness of less than about 10 mils, with a thickness variability of no more than about 10%. The electrolyte reservoir layer comprises fibers having a mean diameter of about 10 microns or less, and has a thickness of less than about 15 mils. Preferably, this layer is melt-blown directly onto the support layer. The nonwoven fibers that comprise the electrolyte reservoir layer and the support layer are selected from the group consisting of polyethylene, polypropylene, polymethylpentene, and combinations thereof. The present invention also provides a method of preparing such a battery separator, as well as a battery incorporating the battery separator. A battery separator according to the present invention is highly uniform, and spontaneously wettable. Further, the battery separator remains spontaneously wettable after contact with the electrolytic solution and provides for a long and stable battery service life.

DESCRIPTION OF THE PREFERRED EMBODIMENTS

The battery separator of the present invention comprises a two-layer composite structure having a macrofiber layer and a microfiber layer. The macrofiber layer is a nonwoven support layer prepared from relatively larger diameter fibers which provides the necessary strength for the battery separator. The microfiber layer is a nonwoven electrolyte reservoir layer prepared from relatively smaller diameter fibers which provides the necessary reservoir for the electrolyte contained by the battery separator. Thus, the battery separator of the present invention comprises a nonwoven support layer comprising, and preferably consisting of, fibers having a mean diameter of at least about 15 microns, and, bonded thereto, a nonwoven electrolyte reservoir layer comprising, and preferably consisting of, fibers having a mean diameter of 10 microns or less and a thickness of less than about 15 mils.

The fibers that comprise each layer, i.e., the support and electrolyte reservoir layer, can be selected from any type of material suitable for use in a battery as a battery separator in accordance with the present invention. Typically, nonwoven layers can be prepared from thermoplastic fibers of polyamides, polyolefins, and mixtures thereof. The fibers that comprise each layer of the present inventive battery separator may be the same or different and are preferably selected from the group consisting of polyethylene, polypropylene, polymethylpentene, and combinations thereof. The fibers of the support and electrolyte reservoir layer are most preferably the same, especially of polypropylene.

The nonwoven support suitable for use in the present invention may be prepared from any number of nonwoven materials, such as spun-bonded or melt-blown fibers. The spunbond process produces webs composed of long filaments with normal textile diameter, formed directly from bulk polymer. Melt-blowing processes produce fibers having diameters that are much smaller than those of typical textiles. *Encyclopedia of Polymer Science & Engineering*, 10, 219–23 (1985). The nonwoven support of the present inventive battery separator is preferably prepared utilizing a spun-bonding process. Such a process yields a nonwoven material having high tensile strength and otherwise suitable properties for use as a support.

The fibers used to form the nonwoven material may have any suitable diameter. In particular, the fiber diameter should be sufficiently large so as to provide sufficient strength to act as a support, e.g., a mean diameter of at least 15 microns. Fibers having a mean diameter of from about 15 to about 100 microns are preferably used to prepare the nonwoven support suitable for use in the battery separator of the present invention. More preferably, the fibers have a diameter of from about 20 to about 80 microns.

The sheet weight and tensile strength of the nonwoven support layer used in the present invention should be sufficiently high so as to provide support for the electrolyte reservoir layer and to resist tearing during the manufacture of the battery separator. Materials having a sheet weight of at least about 15 g/m², and preferably greater than about 25 g/m², are suitable for use in the present invention. Most preferably, the material should have a sheet weight of about 50–100 g/m². Further, the material should have a tensile strength of at least about 5 lb/linear in., preferably, a tensile strength greater than about 10 lb/linear in.

The nonwoven materials that are preferably used to prepare the support layer include, for example, polypropylenes such as Lutrasil™ (about 20 micron diameter fibers, Lutrasil, Freudenberg, Germany) and Typar™ (about 45 micron diameter fibers, Reemay, Old Hickory, Tenn.), and nylons such as Cerex™ (about 20 micron diameter fibers, Fiberweb North America, Simpsonville, S.C.). Most preferably, Unipro™ 150 and Unipro™ 200 polypropylene fibers (about 30 micron diameter fibers, Phillips) are used to prepare the support layer.

In a preferred embodiment of the present invention, the nonwoven support layer is calendared prior to bonding with the nonwoven electrolyte reservoir layer. Calendaring is useful to reduce the thickness of the support layer and to improve the thickness uniformity of the support layer, and thereby reduce the thickness of, and improve the uniformity of, the battery separator prepared using the support layer. Calendaring, however, can adversely affect the strength characteristics of the support layer, and, thus, care should be exercised in calendaring the support layer so as not to adversely the affect the strength of the support layer to such an extent that the support layer will not provide sufficient strength to the battery separator preparing using the support layer. In addition, the material should not be calendared so as to render the support layer nonporous, or so as to adversely affect the pressure drop across the separator to a significant extent, as measured by, for example, the Gurley air flow across the support layer. If the increase in pressure drop is too great, the electrolytic resistance may be adversely affected. Preferably, the pressure drop across the material will be no more than 10 times as great after calendaring as before calendaring. More preferably, the increase in pressure drop will be about 5 to about 7 times as great after calendaring as before calendaring.

The calendaring of the support layer can be carried out using any suitable process. The calendaring process preferably is performed in accordance with the method disclosed in U.S. patent application Ser. No. 08/116,901. In this method, the nonwoven material is calendared between a resilient roll and a nondeformable roll. The nondeformable roll comprises or is manufactured from any material that will not deform upon contact with the nonwoven material, for example, stainless steel. The resilient roll comprises or is covered with a coating of plastic, rubber, or fibrous material, such as silicone rubber, urethane, nylon, or cotton. Preferably, the roll has a combined fiber and thermosetting resin covering, such as one of the Beloit Supertex™ materials. A thorough explanation of these process variables and their effect on the calendaring process may be found in U.S. patent application Ser. No. 08/116,901.

The support layer can be of any suitable thickness, but will be preferably as thin as possible, e.g., sufficient to provide the desired strength to the battery separator. The support layer preferably has a thickness of less than about 20 mils, more preferably less than about 10 mils, and most preferably about 5 to about 8 mils.

The thickness of the support layer should be as uniform as possible. The thickness of the support layer preferably does not vary by more than about 10%, more preferably by not more than about 5%. The thickness variability is determined by measuring the thickness of a section of the material at several points evenly spanning the surface of the material. The standard deviation of these thickness measurements divided by the mean average of these measurements is the thickness variability. In the context of the present invention, thickness is defined as that measured using a gage having a foot area of 0.0276 in² and a pressure loading of 0.25 lbs., resulting in an applied pressure of about 9 psi.

The battery separator is formed by bonding a nonwoven electrolyte reservoir layer to the support layer such that a sufficient degree of adhesion results between the two layers so that the two layers do not physically separate during the subsequent preparation of the present inventive battery separator and the handling of the present inventive battery separator in the manufacture of a battery therefrom. The peeling strength between the two layers generally will be at least about 10 g/linear in., more typically at least about 15 g/linear in. Preferably, the battery separator is a composite structure comprising an electrolyte reservoir layer integrally bonded to a support layer without an adhesive. This bonding of the two layers is preferably performed after the nonwoven support layer has been calendared, although the order of these steps, to the extent calendaring is employed, is not crucial. In fact, the nonwoven support may be calendared before and/or after the nonwoven electrolyte layer has been bonded thereto.

While the nonwoven electrolyte reservoir layer may be bound to the support layer in any suitable manner, the electrolyte reservoir layer preferably is melt-blown directly onto the support layer to produce sufficient adhesion directly between the support and electrolyte reservoir layers. Melt-blowing processes have been widely used to prepare nonwoven fabrics, and the details of typical processes are set forth in U.S. Pat. Nos. 3,978,185 and 4,594,202. In essence, the process employed in the present invention comprises extruding a fiber-forming polymer through an orifice into a high-velocity heated gas stream which is directed onto a collection surface, such as a rotating collection roll in operative relationship with a rotating mandrel. The gas stream attenuates the extruded polymeric material to form microfibers in the gap between the orifice and the collection surface, which are cooled in the gap prior to their collection onto the collection surface, e.g., a suitable support layer in accordance with the present invention. The many variables that can affect the melt-blowing process, for example, polymer, air stream velocity, volume, temperature, and pressure of the air delivered to the fiberizing nozzles, and the effect of the variables on the formation of the melt-blown layer, are well-known to those skilled in the art.

In preparing the battery separators of the present invention in such a preferred manner, the nonwoven support serves as the collection surface and is mounted onto the collection roll of a melt-blowing apparatus prior to formation of the electrolyte reservoir layer. Commercially available materials suitable as supports, such as Unipro™ 150 and Unipro™ 200, typically are supplied as sheets of fabric. If the support has been calendared as previously discussed, one side of the fabric will become rough relative to the other side. In this case, it is preferred to melt-blow the electrolyte reservoir layer onto the rough side of the support layer to enhance the bonding between the electrolyte reservoir layer and the support layer.

The bonding between the layers may be further enhanced by applying a precoat of the melt-blown layer. When applying the precoat, the process conditions preferably are adjusted so that the precoat fibers provide optimum adhesion to the support layer. The precoat layer thus formed will assist in the integral bonding of the remainder of the electrolyte reservoir layer to the support layer. As is well-known in the art, several process variables may be adjusted to achieve this result. For example, if the distance between the orifices and the collection surface is reduced, adhesion between the electrolyte reservoir layer and the support layer will be improved.

The bonding of the electrolyte reservoir layer to the support layer should be accomplished such that the electrolyte reservoir layer is homogeneously bonded to the support layer. Uniformity of bonding may be determined visually, e.g., by holding the bonded layers up to a light source and determining whether the bonded layers are uniformly translucent, or by feel. Also, thickness variability measurements may be made with a thickness gage as described above.

When the fibers of the support layer have a sufficient diameter to provide the requisite tensile strength, the support layer typically will be unable to provide the desired capillarity. Consequently, to provide the capillarity required of a battery separator, the electrolyte reservoir layer should comprise fibers having a smaller diameter. Such fibers could not typically be used alone, i.e., without the support layer, inasmuch as such fibers generally will have insufficient strength to survive battery manufacture without the aid of the support layer. The electrolyte reservoir layer preferably has a mean fiber diameter that is smaller than the mean fiber diameter of the support layer by at least a factor of five, and most preferably by a factor of 10 or more. In absolute terms, the preferred fiber diameter of the electrolyte reservoir layer is less than about 10 microns, and preferably ranges from about 2 to about 8 microns. The electrolyte reservoir layer may have any suitable basis weight. Preferably, the electrolyte reservoir layer has a basis weight less than about 60 g/m$^2$, most preferably from about 20 to about 60 g/m$^2$.

The electrolyte reservoir layer may have any suitable thickness. The electrolyte reservoir layer preferably has a thickness of from about 5 to about 15 mils, most preferably less than about 10 mils. The desired thickness will typically be determined by the amount of electrolytic solution to be held by the battery and by the desired battery performance. As the thickness of the battery separator increases, it will hold more electrolyte, which is a beneficial effect. An increase in separator thickness, however, will also result in an increase in the electrolytic resistance of the separator, and subsequently the impedance of a battery utilizing such a separator, which is an undesirable effect. Moreover, an increase in the thickness of the battery separator will result in a reduction of the active material in the battery for a given volume, which is also an undesirable effect. For most applications, the thickness of the electrolyte reservoir layer is optimally about 3 to about 10 mils.

Since both the support layer and the electrolyte reservoir layer of the present inventive battery separator comprise, and preferably consist of, fibers which have low surface energy and are therefore not spontaneously wettable with electrolyte, the present inventive battery separator is preferably surface-modified to render it spontaneously wettable, so that the separator may be spontaneously wetted by the electrolytic solution. Such surface modification preferably is accomplished after the electrolyte reservoir layer and the support layer have been integrally bonded; however, the support layer may be pretreated to render it spontaneously wettable prior to application of the electrolyte reservoir layer. Preferably, the separator will be modified to have a critical wetting surface tension (CWST) of at least about 70 dynes/cm as determined by the CWST test disclosed in U.S. Pat. No. 4,880,548. The preferred method of rendering the separator spontaneously wettable is by graft polymerizing the separator with a hydrophilic monomer. Preferred examples of such monomers include acrylic or methacrylic acid monomers having alcohol functional groups, such as acrylic acid, methacrylic acid, diethyleneglycol dimethacrylate, tertiary butyl alcohol, hydroxyethylacrylate, hydroxyethylmethacrylate, hydroxypropylacrylate, hydroxypropylmethacrylate, and combinations thereof. Particularly preferred monomers are acrylic acid, methacrylic acid, hydroxyethylmethacrylate, hydroxypropylacrylate, and combinations thereof.

Any suitable means may be used to graft polymerize the monomer onto the hydrophobic fibers employed in the present invention. Radiation grafting is the preferred technique to achieve the desired result. The source of the radiation can be from radioactive isotopes such as cobalt 60, strontium 90, or cesium 137. Alternatively, the radiation may come from such sources such as X-ray machines, electron accelerators, ultraviolet generators, and the like. Electron beam radiation is the preferred source of radiation in that it yields a uniformly grafted product.

Grafting will typically be accomplished by either irradiating the separator and then exposing it to a suitable solution of monomer, or, alternatively, by irradiating the separator while it is contacted with a solution of the monomer. If the polymerization is effected by the former method, the separator should contact the monomer solution as quickly as possible in order to minimize any side-reactions that will deplete the active sites generated by the radiation. In either case, the radiation should be conducted in the absence of oxygen, which reduces the effectiveness of the process. Preferably, irradiation is performed under nitrogen inerting. After completion, the battery separator should be uniformly wettable. A practical measure of the wettability of a battery separator is wicking rate of the battery separator, e.g., the relative time for a battery separator to vertically wick an electrolyte a given distance. The present inventive battery separator preferably is able to vertically wick 40% KOH to a distance of 1 inch in less than about 300 seconds, more preferably less than about 200 seconds, and most preferably less than about 100 seconds.

The battery separator of the present invention is highly uniform. The uniformity of the battery separator may be measured by a number of tests, for example, by mapping thickness, Gurley air flow, resistance, and so forth.

The battery separator of the present invention may be incorporated into a battery using conventional manufacturing processes. A wide variety of primary and secondary batteries fall within the purview of the present invention, for example, AgO/Zn, Ag$_2$O/Zn, HgO/Zn, HgO/Cd, Ni/Zn, Ni/Cd, Ni/MH, and Zn/air electrochemical systems. These batteries may be made by, for example, arranging a number of battery cells in series, wherein at least one of the cells contains a battery separator produced in accordance with the present invention.

The present invention also encompasses a method of making a battery separator as described herein. The method comprises providing a support layer comprising fibers having a mean diameter of at least about 15 microns, and adhering an electrolyte reservoir layer onto this support layer. Preferably, the layers are integrally bonded together. This step should be performed such that the resulting electrolyte reservoir layer has a mean fiber diameter less than about 10 microns and a thickness less than about 10 mils.

The fibers used in the method preferably are selected from the group consisting of polyethylene, polypropylene, polymethylpentene, and combinations thereof. More preferably, the process uses polypropylene fibers, wherein the fibers of the support have a mean fiber diameter that is at least 5 times greater than that of the fibers comprising the electrolyte reservoir layer.

In a preferred embodiment, the method of the present invention includes the step of calendaring the support layer to a thickness of less than about 10 mils with a thickness variability of no more than about 10%. This step is performed before the bonding of the electrolyte reservoir layer to the support layer, although this is not critical.

The method of the present invention also requires rendering the battery separator spontaneously wettable. This step may be accomplished by any suitable means, for example, by radiation grafting a hydrophilic monomer onto the separator. As previously discussed, the preferred method includes grafting a monomer such as acrylic or methacrylic acid onto the separator using electron beam radiation, which method results in a uniformly grafted product.

The following examples further illustrate the present invention and, of course, should not be construed as in any way limiting its scope.

EXAMPLE 1

This example provides an illustration of a battery separator according to the present invention.

A roll of nonwoven polypropylene fabric prepared from fibers believed to be of about 20–30 microns diameter and having a thickness of 11 mil, a basis weight of 50 g/m$^2$, and a Gurley air flow of 100 ml of less than 0.12 seconds was calendared to a thickness of 5 mil. A 4 mil layer of polypropylene fiber of about 3–5 microns diameter was melt-blown onto this calendared support. The resulting battery separator had a thickness of 9 mils, a basis weight of 86 g/m$^2$, and a Gurley air flow of 100 ml of 1.5 seconds.

The roll of material was subjected to beta-radiation in an electron beam accelerator to a total dose of 7 Mrads, and was then contacted with an aqueous monomer bath containing 10% hydroxyethylmethacrylate, 6–10% methacrylic acid, 0.05% diethyleneglycol dimethacrylate (DEGDMA), and 25% tertiary butyl alcohol (TBA) in a nitrogen atmosphere. The roll was rewound in the nitrogen atmosphere and stored at room temperature for three days. After storage, the roll was washed with water for approximately four hours, and then dried.

The battery separator thus formed was highly uniform and possessed desirable physical properties. In particular, the separator possessed an electrolytic resistance of 23 mΩ-in$^2$ in 40% KOH, a 230% absorption of 40% KOH, and a Gurley air flow (100 ml) of 4.6 seconds. The battery separator is expected to be especially useful in alkaline Ni/MH and Ni/Cd batteries.

EXAMPLE 2

This example provides another illustration of a battery separator according to the present invention.

A roll of nonwoven polypropylene fabric prepared from fibers believed to be of about 20–30 microns diameter and having a thickness of 14 mil, a basis weight of 67 g/m$^2$, and a Gurley air flow of 100 ml of less than 0.12 seconds was calendared to a thickness of 5.9 mil. Onto this calendared support layer was melt-blown a 4 mil layer of polypropylene fiber having a fiber size of about 3–5 microns. The resulting battery separator had a thickness of 9.9 mils, a basis weight of 110 g/m$^2$, and a Gurley air flow of 100 ml of 1.7 seconds.

The roll of material was subjected to beta-radiation in an electron beam accelerator to a total dose of 7 Mrads, and was then exposed to an aqueous monomer bath containing 10% hydroxyethylmethacrylate, 6–10% methacrylic acid, 0.05% DEGDMA, and 25% TBA in a nitrogen atmosphere. The roll was rewound in the nitrogen atmosphere and stored at room temperature for three days. After storage, the roll was washed with water for approximately four hours, and then dried.

The battery separator thus formed was highly uniform and possessed desirable physical properties. In particular, the battery separator had an electrolytic resistance of 26 mΩ-in$^2$ in 40% KOH and a 280% absorption of 40% KOH. The Gurley air flow (100 ml) was 5.7 seconds. The battery separator is expected to be especially useful in alkaline Ni/MH and Ni/Cd batteries.

EXAMPLE 3

This example further illustrates the preparation of battery separators of the present invention.

A roll of Unipro™ 150 polypropylene fabric and a roll of Unipro™ 200 polypropylene fabric, prepared from fibers of about 30 microns diameter (as determined by measurement with an optical microscope), were calendared to thicknesses of 5 and 5.9 mils, respectively. To each of the rolls was applied a layer of melt-blown polypropylene having a fiber diameter of about 7 microns. The thus-treated Unipro™ 150 and Unipro™ 200 rolls had final sheet weights of 64 g/m$^2$ and 83 g/m$^2$, respectively. The rolls were subsequently exposed to beta-radiation in an electron accelerator to a total dose of 7 Mrads, and then treated to an aqueous monomer bath containing 10% hydroxyethylmethacrylate, 6–10% methacrylic acid, 0.05% DEGDMA, and 25% TBA in a nitrogen atmosphere.

The rolls were rewound in the nitrogen atmosphere and stored at room temperature for three days. After storage, the rolls were washed with water for approximately four hours, and then dried. The grafted materials thus formed were highly uniform and were suitable for use as battery separators in, for example, Ni/MH and Ni/Cd batteries.

EXAMPLE 4

This example illustrates the superiority of the battery separators of the present invention over conventionally available materials.

From the rolls of the grafted materials of Example 3 were cut strips of fabric four inches long and one inch wide. Using a ball-point pen, marks were made at 1" and 2" along the length of each strip. The strips were then held in position by a sample holder and dipped into a beaker containing 250 ml 30% KOH solution up to the 1" mark. The average time over three runs for the solution to rise to the 2" mark was recorded. As a comparison, this test was repeated with samples of Unipro™ 150 and 200 that had been grafted in the same manner set out in Example 3 but which had not been calendared nor bonded to an electrolyte reservoir layer.

With respect to Unipro™ 150, the battery separator of the present invention was able to wick the electrolytic solution in 131 seconds, as compared to over 1200 seconds for the grafted Unipro™ 150 material alone, i.e., almost 10 times more quickly than the grafted Unipro™ 150 comparative sample. The battery separator constructed from Unipro™ 200 possessed even more remarkable properties in that it was able to wick the electrolytic solution in 39 seconds as compared to 800 seconds for the grafted Unipro™ 150 material alone, i.e., over 20 times faster than the comparative sample. The results of this test clearly indicate that the battery separators of the present invention are far superior to conventional similar materials.

EXAMPLE 5

This example illustrates the superior uniformity of the present inventive battery separator as measured by thickness mapping.

Samples of Unipro™ 150 were calendared at a roll temperature of 121° F. under a pressure of 170 psi at 30 ft/min. In addition, samples of Unipro™ 200 were calendared at a roll temperature of 276° F. under a pressure of 1500 psi at 30 ft/min. Onto some of samples of both sets of samples was melt-blown a polypropylene electrolyte reservoir layer, thus forming integrally bonded composite battery separators of the present invention.

The calendared samples with and without the melt-blown polypropylene electrolyte reservoir layer were tested for thickness variation under the following conditions. A 10 foot-long swatch of material having a width of approximately 10" was cut from each roll of material. Using a Federal 57B thickness gage having a foot area of 0.0276 in$^2$, a pressure loading of 0.25 lb. was applied to the sample (resulting in a pressure of about 9 psi), and the thickness was read from the gage. Swatches of uncalendared, unaltered Unipro™ 150 and Unipro™ 200 also were mapped in this fashion.

Beginning near one corner of the material, five readings were taken at approximately 2" intervals along the width of the material. The gage was then moved forward approximately 1" and the five measurements taken again. This procedure was repeated along the entire 10' length of material. The results of this test are set forth below, wherein n=number of gage readings, t=thickness (mils), and $\sigma/\mu$= thickness variability.

| Sample | n | t | $\sigma/\mu$ (%) |
|---|---|---|---|
| Unipro™ 150 (uncalendared) | 210 | 12.28 | 14.2 |
| Unipro™ 150 (calendared only) | 181 | 5.14 | 10.9 |
| Unipro™ 150 (calendared + melt-blown) | 112 | 7.63 | 7.2 |
| Unipro™ 200 (uncalendared) | 220 | 14.85 | 12.0 |
| Unipro™ 200 (calendared only) | 117 | 5.85 | 8.7 |
| Unipro™ 200 (calendared + melt-blown) | 240 | 7.88 | 5.6 |

These test results clearly demonstrate the superior uniformity of the battery separator of the present invention resulting from the calendaring and melt-blowing techniques used to prepare the present inventive battery separator.

EXAMPLE 6

This example illustrates the superior uniformity of the battery separator of the present invention as measured by air flow mapping.

The materials of Example 5 were tested for uniformity of pressure drop across the surface of the material by measuring the Gurley air flow through four sheets of the fabrics. Gurley air flow measurements (sec) were taken at twelve points along the surface of the material. The results of this test are set forth below.

| Sample | Gurley flow (100 ml) | $\sigma/\mu$ (%) | Absolute ΔP28 (" water column) |
|---|---|---|---|
| Unipro™ 150 (uncalendared) | 0.10 s | 10.0 | 0.15 |
| Unipro™ 150 (calendared only) | 0.18 s | 11.0 | 0.86 |
| Unipro™ 150 (calendared + melt-blown) | 0.73 s | 5.5 | 3.6 |
| Unipro™ 200 (uncalendared) | 0.10 s | 20.0 | 0.1 |
| Unipro™ 200 (calendared only) | 0.42 s | 21.4 | 2.1 |
| Unipro™ 200 (calendared + melt-blown) | 1.43 s | 10.5 | 8.0 |

These test results further demonstrate the excellent uniformity of the battery separators of the present invention.

EXAMPLE 7

This example provides an illustration of the stability and permanent wettability of the battery separators of the present invention. Battery separators prepared in accordance with Examples 1 and 2 were placed in a water bath at 71° C. for 7 days, and then dried. The material prepared in accordance with Example 2 lost only 1.5% of its pretesting weight. The material of Example 1 fared even better, losing only 0.4% of its pretesting weight.

As a comparison, a Celgard™ 3401 battery separator was subjected to the same test conditions. This separator is believed to be made wettable with a leachable surfactant. After 7 days, this separator lost 9.1% of its weight, i.e., several times the weight loss of the battery separators of the present invention.

EXAMPLE 8

This example illustrates the stability of the battery separators of the present invention. Battery separators prepared in accordance with Examples 1 and 2 were placed in a bath of 40% KOH at 71° C. for 23 days to determine the effect on electrolytic resistance. The results of this test are set forth below.

| | Electrolytic Resistance (mΩ-in$^2$) | | | |
|---|---|---|---|---|
| | Before Soaking | | After Soaking | |
| Sample | Run 1 | Run 2 | Run 1 | Run 2 |
| Example 1 | 35.4 | 31.3 | 35.4 | 33.6 |
| Example 2 | 42.2 | 40.0 | 45.1 | 44.0 |

These test results indicate that the battery separators of the present invention are highly stable with respect to electrolytic resistance under even extended and severe conditions.

All of the references cited herein, including publications, patents, and patent applications, are hereby incorporated in their entireties by reference.

While this invention has been described with an emphasis upon preferred embodiments, it will be apparent to those of ordinary skill in the art that variations of the preferred embodiments can be used and that it is intended that the invention can be practiced otherwise than as specifically described herein. Accordingly, this invention includes all modifications encompassed within the spirit and scope of the invention as defined by the following claims.

What is claimed is:

1. A battery separator consisting of
   a nonwoven support layer comprising fibers having a mean diameter of at least about 15 microns, and
   a nonwoven electrolyte reservoir layer comprising fibers having a mean diameter of about 10 microns or less, which has a thickness of less than about 15 mils and a basis weight of less than about 60 g/m², and which is bonded to said support layer,
   wherein said fibers of said nonwoven support layer and said nonwoven electrolyte reservoir layer are selected from the group consisting of polyethylene, polypropylene, polymethylpentene, and combinations thereof.

2. The battery separator of claim 1, wherein said nonwoven electrolyte reservoir layer is integrally bonded to said support layer.

3. The battery separator of claim 2, wherein said nonwoven support layer has a thickness of less than about 10 mils.

4. The battery separator of claim 3, wherein said nonwoven support layer has been calendared.

5. The battery separator of claim 4, wherein said nonwoven support layer has a thickness variability of no more than about 10%.

6. The battery separator of claim 5, wherein said support layer consists of fibers having a mean fiber diameter at least about 5 times greater than the mean fiber diameter of the fibers of said electrolyte reservoir layer.

7. The battery separator of claim 6, wherein said battery separator is spontaneously wettable by an electrolyte.

8. The battery separator of claim 7, wherein a monomer is graft polymerized onto said battery separator to render said battery separator spontaneously wettable by an electrolyte.

9. The batter separator of claim 8, wherein said support layer has a weight of at least about 15 g/m².

10. The battery separator of claim 9, wherein said support layer has a tensile strength in the machine direction of at least about 5 lb/linear in. width.

11. The battery separator of claim 10, wherein said support layer has a tensile strength in the machine direction of at least about 10 lb/linear in. width.

12. The battery separator of claim 11, wherein said support layer has a thickness before calendaring of less than about 15 mils and said calendaring reduces the thickness of said support layer by at least about 50%.

13. The battery separator of claim 12, wherein said calendaring increases the pressure drop across said support layer by no more than 10 times.

14. The battery separator of claim 13, wherein said electrolyte reservoir layer comprises fibers having a diameter of about 2 microns to about 8 microns.

15. The battery separator of claim 14, wherein said electrolyte reservoir layer has a thickness of less than about 10 mils.

16. The battery separator of claim 15, wherein said electrolyte reservoir layer has a weight of about 20 g/m² to about 60 g/m².

17. The battery separator of claim 16, wherein said monomer is selected from the group consisting of acrylic acid, methacrylic acid, hydroxyethylmethacrylate, hydroxypropylacrylate, and combinations thereof.

18. The battery separator of claim 17, wherein said nonwoven substrate layer has been calendared between a resilient roll and a nondeformable roll.

19. The battery separator of claim 18, wherein said battery separator has an electrical resistance of less than about 50 mΩ-in² in 40% KOH.

20. The battery separator of claim 19, wherein said battery separator is able to wick 40% KOH to a distance of 1 inch in less than about 300 seconds.

21. A rechargeable starved-electrolyte battery, wherein the improvement comprises the inclusion of the battery separator of claim 1.

22. The rechargeable starved-electrolyte battery of claim 21, wherein said battery separator is grafted with a polymer rendering said battery separator spontaneously wettable by said electrolyte.

* * * * *